United States Patent
Kobayashi et al.

(10) Patent No.: US 9,529,095 B2
(45) Date of Patent: Dec. 27, 2016

(54) MEASURING DEVICE

(71) Applicant: KABUSHIKI KAISHA TOSHIBA, Tokyo (JP)

(72) Inventors: Mitsuyoshi Kobayashi, Tokyo (JP); Rei Hasegawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/837,097

(22) Filed: Aug. 27, 2015

(65) Prior Publication Data

US 2016/0274247 A1 Sep. 22, 2016

(30) Foreign Application Priority Data

Mar. 18, 2015 (JP) .................................. 2015-055442

(51) Int. Cl.
*G01T 1/202* (2006.01)
*G01T 1/20* (2006.01)

(52) U.S. Cl.
CPC .................................. *G01T 1/2002* (2013.01)

(58) Field of Classification Search
CPC ........... G01T 1/202; G01T 1/20; G01T 1/2002
See application file for complete search history.

(56) References Cited

U.S. PATENT DOCUMENTS

| | | | |
|---|---|---|---|
| 2009/0294683 A1* | 12/2009 | Perna | G01T 1/202 250/370.11 |
| 2010/0006769 A1* | 1/2010 | Kraft | G01T 1/2907 250/370.11 |
| 2011/0176662 A1 | 7/2011 | Watanabe et al. | |
| 2012/0061577 A1* | 3/2012 | Oleinik | G01T 1/2002 250/366 |
| 2013/0324836 A1* | 12/2013 | Yamaya | G01T 1/2985 600/411 |

FOREIGN PATENT DOCUMENTS

| | | |
|---|---|---|
| JP | 2004-125722 | 4/2004 |
| JP | 2004-301777 | 10/2004 |
| JP | 2011-041795 | 3/2011 |

\* cited by examiner

*Primary Examiner* — David Porta
*Assistant Examiner* — Faye Boosalis
(74) *Attorney, Agent, or Firm* — Finnegan, Henderson, Farabow, Garrett & Dunner LLP

(57) ABSTRACT

According to an embodiment, a measuring device includes a plurality of scintillators, plurality of receiving elements, and a processor. The scintillators each convert incident radiation into light. The receiving elements each convert scintillation light received by a light receiving surface thereof into an electric signal. The processor acquires a value corresponding to an intensity of the incident radiation based on the electric signal. Each of the scintillators includes an incident surface on which the radiation is incident. The incident surface includes an inclination that has a predetermined angle with respect to the light receiving surface and that is asymmetric with respect to a center of the incident surface. The scintillators are arrayed on a plane including the light receiving surface.

9 Claims, 18 Drawing Sheets

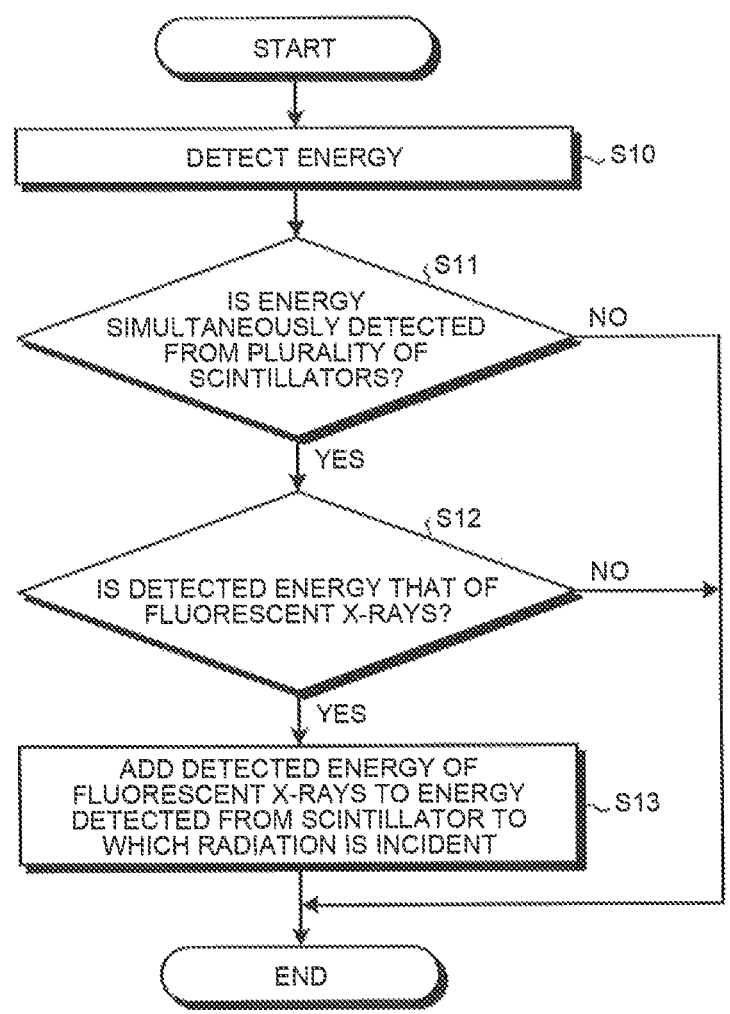

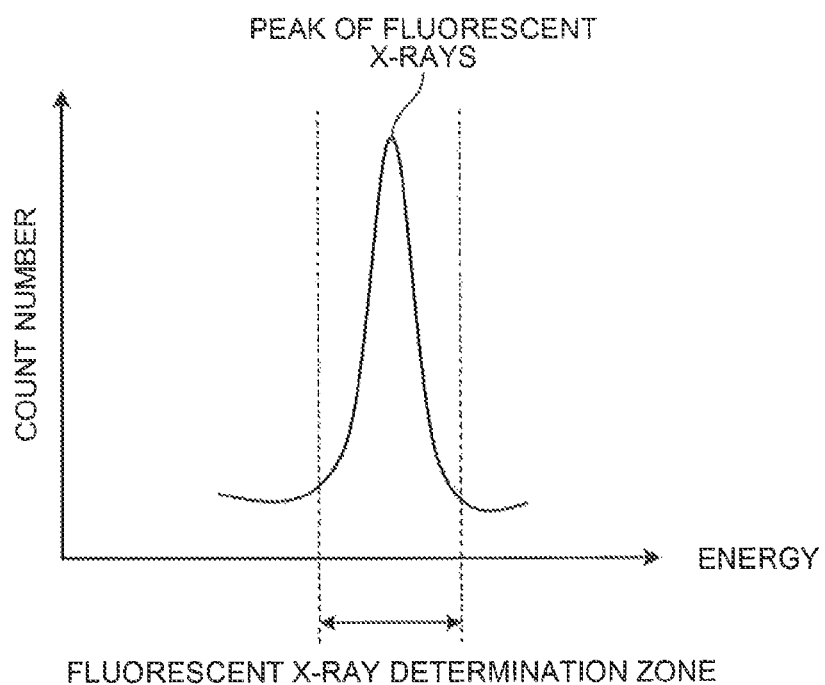

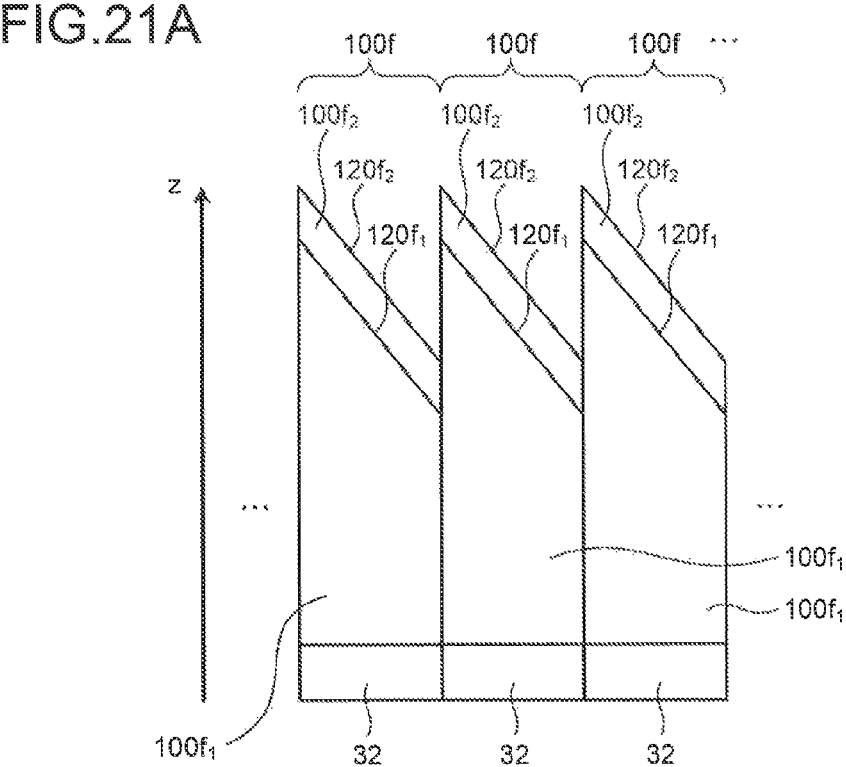
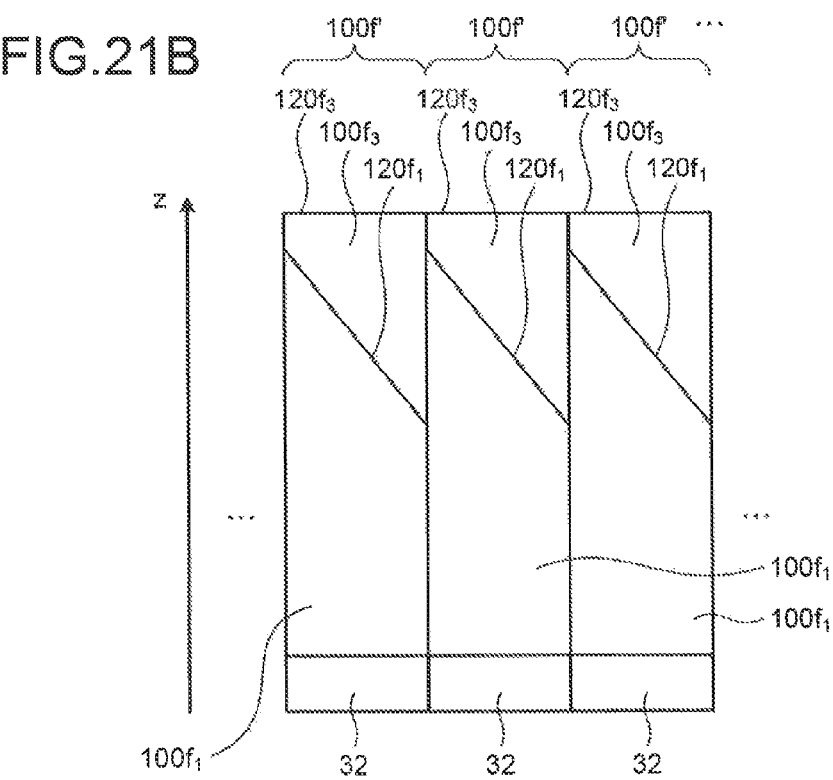

MEASURING DEVICE

CROSS-REFERENCE TO RELATED APPLICATION(S)

This application is based upon and claims the benefit of priority from Japanese Patent Application No. 2015-055442, filed on Mar. 18, 2015; the entire contents of which are incorporated herein by reference.

FIELD

Embodiments described herein relate generally to a measuring device.

BACKGROUND

Technologies are known in which an energy spectrum of radiation transmitted through a subject is measured to obtain transmissibility per unit energy specific to the material constituting the subject. An indirect conversion method and a direct conversion method are known as methods for measuring the energy of the radiation.

In the direct conversion method, the energy of the radiation is directly converted into an electrical charge, and measured as a signal output. In the indirect conversion method, the radiation is converted into visible light using a fluorescent material, such as a scintillator, and the light quantity of the visible light is measured to obtain the energy of photons. The indirect conversion method allows the size and the type of the scintillator to be varied, so that the energy of high-energy radiation can be received in a detector, and thus can be more flexibly used.

Interactions between X-rays and a substance include generation of fluorescent X-rays. Also in the scintillator used in the detector, the incident X-rays generate the fluorescent X-rays having intrinsic energy from atoms constituting the scintillator. If the generated fluorescent X-rays are emitted out of the scintillator, the apparent energy detected by the detector decreases by an amount corresponding to the amount of the emitted fluorescent X-rays, so that a correct measurement value is difficult to obtain, which is a problem.

BRIEF DESCRIPTION OF THE DRAWINGS

FIG. 13 is a flowchart of an example of escape correction using simultaneous counting according to the first embodiment;

FIG. 14 is a diagram illustrating a fluorescent X-ray determination zone according to the first embodiment set in the energy spectrum;

FIG. 15 is a diagram illustrating an example of the scintillator array including the scintillators as viewed from the incident surface;

FIGS. 21A and 21B are diagrams each illustrating a configuration of an example of scintillators according to a third modification of the first embodiment.

DETAILED DESCRIPTION

According to an embodiment, a measuring device includes a plurality of scintillators, plurality of receiving elements, and a processor. The scintillators each convert incident radiation into light. The receiving elements each convert scintillation light received by a light receiving surface thereof into an electric signal. The processor acquires a value corresponding to an intensity of the incident radiation based on the electric signal. Each of the scintillators includes an incident surface on which the radiation is incident. The incident surface includes an inclination that has a predetermined angle with respect to the light receiving surface and that is asymmetric with respect to a center of the incident surface. The scintillators are arrayed on a plane including the light receiving surface.

The following describes a measuring device according to embodiments.

Figure 1:
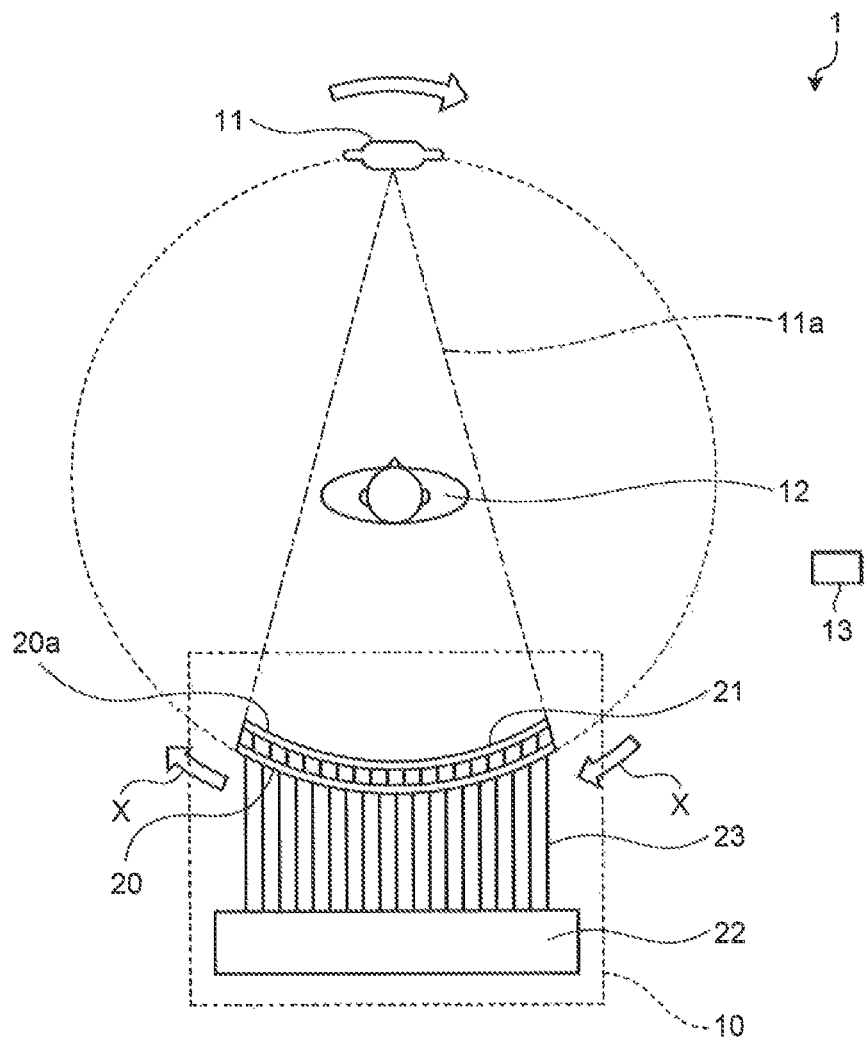
FIG. 1 is a schematic diagram illustrating an example of an inspection device in which a measuring device of embodiments can be used.

FIG. 1 is a schematic diagram illustrating an example of an inspection device in which the measuring device of the embodiments can be used. In FIG. 1, this inspection device 1 includes a light source 11, a radiation detection device 10, and a drive unit 13. The light source 11 and the drive unit 13 are electrically connected to the radiation detection device 10.

The light source 11 and the radiation detection device 10 are arranged opposite to each other with a space therebetween. A subject 12 lies between the radiation detection device 10 and the light source 11. The light source 11 and the radiation detection device 10 are installed so as to be rotatable about the subject 12 while maintaining the oppositely arranged state.

The light source 11 emits radiation 11a, such as X-rays, toward the opposite radiation detection device 10. The radiation 11a emitted from the light source 11 is transmitted through the subject 12, and enters the radiation detection device 10.

The radiation detection device 10 corresponds to the measuring device according to the embodiments, and is a device that detects light. The radiation detection device 10 includes a plurality of detection units 20 and a controller 22. The detection units 20 are electrically connected to the controller 22 by signal lines 23. In the present embodiments, the detection units 20 provided in the radiation detection device 10 are arranged along the direction of rotation of the radiation detection device 10 (along the direction of arrows X in FIG. 1).

After the radiation 11a is emitted from the light source 11 and transmitted through the subject 12, each of the detection units 20 receives the radiation 11a at an incident surface 20a through a collimator 21. The collimator 21 is installed on the incident surface 20a side of the detection units 20, and prevents scattered radiation from entering the detection units 20.

The detection units 20 detect the received light. The detection units 20 then outputs signals corresponding to the detected light through the signal lines 23 to the controller 22. The controller 22 controls the entire inspection device 1. The controller 22 acquires the signals from the detection units 20.

In the present embodiments, the controller 22 calculates an energy spectrum represented by the number of photons per unit energy of the radiation 11a incident in the detection units 20, based on the current values of the acquired signals (photocurrents) (energy corresponding to the crest values of the signals). The controller 22 then generates an image of a projected section of the subject 12 from the energy spectrum of the radiation 11a incident in the detection units 20.

The drive unit 13 rotates the light source 11 and the radiation detection device 10 about the subject 12 lying between the light source 11 and the radiation detection device 10 while maintaining the oppositely arranged state thereof. This operation allows the inspection device 1 to generate the image of the projected section of the subject 12.

The subject 12 is not limited to a human body. The subject 12 may be an animal, a plant, or a non-living body such as an object. In other words, the inspection device 1 can be used for tomographic viewing of human bodies, animals, and plants, and also as various types of inspection devices such as a security device for, for example, viewing through the inside of an object.

Figure 2A:
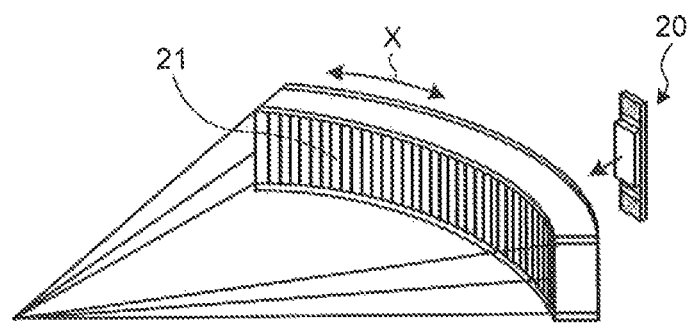
FIGS. 2A and 2B are explanatory diagrams of detection units that can be used in the embodiments.
Figure 2B:
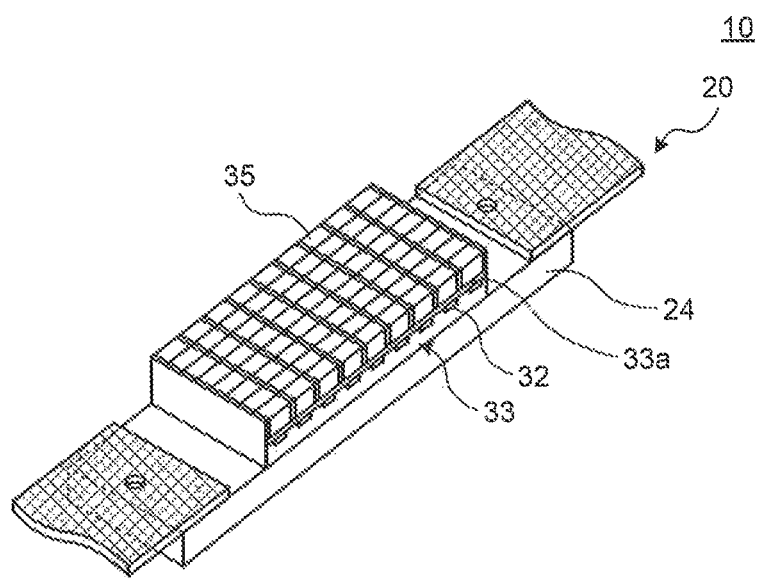

FIGS. 2A and 2B are explanatory diagrams of the detection units 20 that can be used in the embodiments. FIG. 2A is a diagram illustrating an example of a state of arrangement of the detection units 20. The detection units 20 are arranged substantially in a circular arc along the direction of rotation of the detection units 20 (refer to arrow X in FIG. 2A).

FIG. 2B is a schematic diagram illustrating an example of each of the detection units 20. The detection unit 20 includes a detector array 33 and a scintillator layer 35 on a supporting substrate 24.

The scintillator layer 35 emits light (scintillation light [fluorescence]) according to the incident radiation such as X-rays. The scintillation light is, for example, light in the visible light region or light in the ultraviolet light region. The detector array 33 detects the scintillation light emitted by the scintillator layer 35. The detector array 33 has a configuration in which a plurality of light receiving elements 32 are arranged. The light receiving elements 32 are arranged along a first surface 33a that is a counter surface opposed to the scintillator layer 35. In other words, in the present embodiments, the radiation detection device 10 is provided with the scintillator layer 35 on the light incidence side of the detector array 33.

Figure 3:
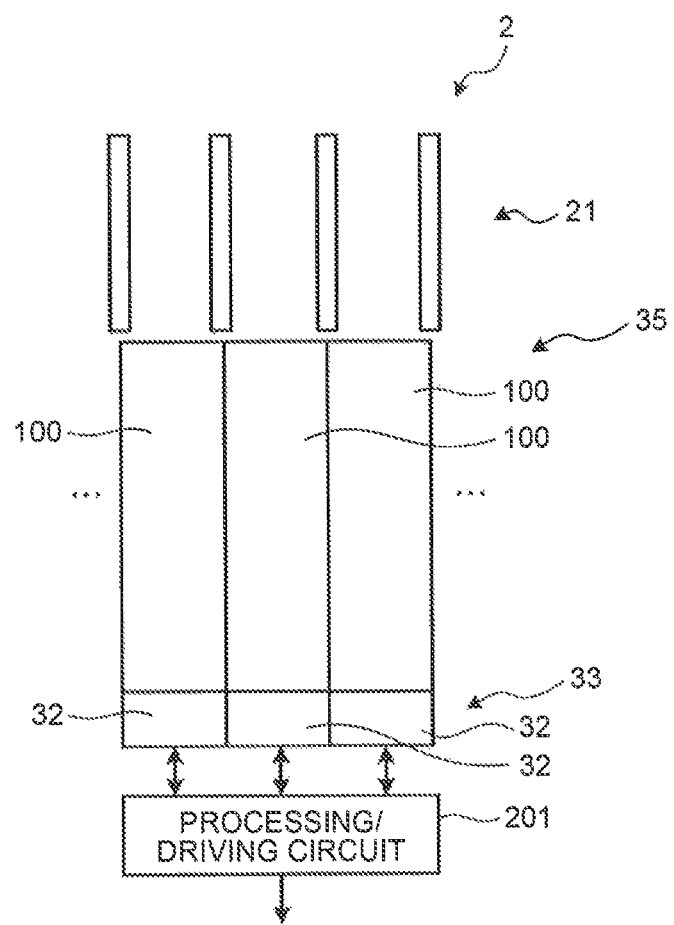
FIG. 3 is a diagram illustrating in more detail the configuration example of the measuring device that can be used in the embodiments.

FIG. 3 illustrates in more detail the configuration example of the measuring device that can be used in the embodiments. In FIG. 3, this measuring device 2 includes the collimator 21, the scintillator layer 35, and the detector array 33, which have been described above, and a processing/driving circuit 201 included in the controller 22. The scintillator layer 35 includes a plurality of scintillators 100. The detector array 33 includes the plurality of light receiving elements 32. FIG. 3 illustrates sections of the collimator 21, the scintillator layer 35, and the detector array 33 taken in a plane parallel to the incident direction of the radiation.

In the example of FIG. 3, one light receiving element 32 is provided for each scintillator 100. Respective light receiving surfaces of the light receiving elements 32 are arranged in a grid in one plane to form an array. Accordingly, incident surfaces of the scintillators 100, that is, surfaces at ends thereof opposed to the light receiving surfaces of the light receiving elements 32, are also arranged in a grid in one plane to form an array.

In the example of FIG. 3, elements of the collimator 21 are arranged at boundary portions between the adjacent scintillators 100. In the measuring device 2, the radiation such as X-rays emitted from the light source 11 enters the scintillators 100 through the collimator 21, and is converted into the scintillation light in the scintillators 100. Photons emitted by the scintillation light enter the light receiving elements 32.

An angle of incidence of the radiation with respect to the scintillators 100 is defined as an angle from the direction of an axis orthogonal to the arrangement plane of the scintillators 100 (the light receiving surfaces of the light receiving elements 32). The collimator 21 arranged in FIG. 3 plays a role of limiting the angle of the radiation incident to the scintillators 100 to reduce the radiation that has a large angle of incidence with respect to the scintillators 100, and hence, is likely to simultaneously generate photons between the adjacent scintillators 100.

The signals output from the light receiving elements 32 are transmitted to the processing/driving circuit 201 at the subsequent stage, and are subjected to predetermined signal processing such as waveform shaping and analog/digital conversion processing. The configuration of the measuring device 2 that can be used in the present embodiments is not limited to the configuration illustrated in FIG. 3. For example, the surfaces of the scintillators 100 may be covered with a material that reflects the photons. For example, a resin serving as a light guide may be applied between the scintillators 100 and the light receiving elements 32, and the scintillators 100 may be spaced from the collimator 21.

The scintillators 100 according to the embodiments are solid, and the material thereof can be, for example, NaI, cerium-doped lutetium yttrium orthosilicate (LYSO), or yttrium aluminum perovskite (YAP).

The radiation transmitted through the collimator 21 enters the scintillators 100, and is converted into the scintillation light in the scintillators 100. In the scintillators 100, the radiation loses energy in proportion to the number of the generated photons of the scintillation light. Therefore, the energy of the radiation incident to the scintillators 100 can be calculated back by measuring the number of the photons of the scintillation light with, for example, the light receiving elements 32.

The light receiving unit of an indirect conversion type as described above is constituted by, for example, elements capable of amplifying signals in order to obtain a good signal-to-noise ratio, in some cases. Examples of the light receiving elements capable of amplifying the signals include, but are not limited to, photomultiplier tubes and avalanche photodiodes (APDs). When signal electrons are amplified in an avalanching manner as is done by the APDs, finally obtained detection signals include statistical fluctuations. In this case, a peak of the energy spectrum is known to have a width even if radiation having a single energy level is emitted. Due to this, the radiation measurement needs data with a certain level of large sample size, so that an analysis technique, such as fitting, is applied to the obtained energy spectrum to calculate, for example, the amount of the radiation incident to the scintillators.

Occurrence of Escape in Scintillator

Figure 4:
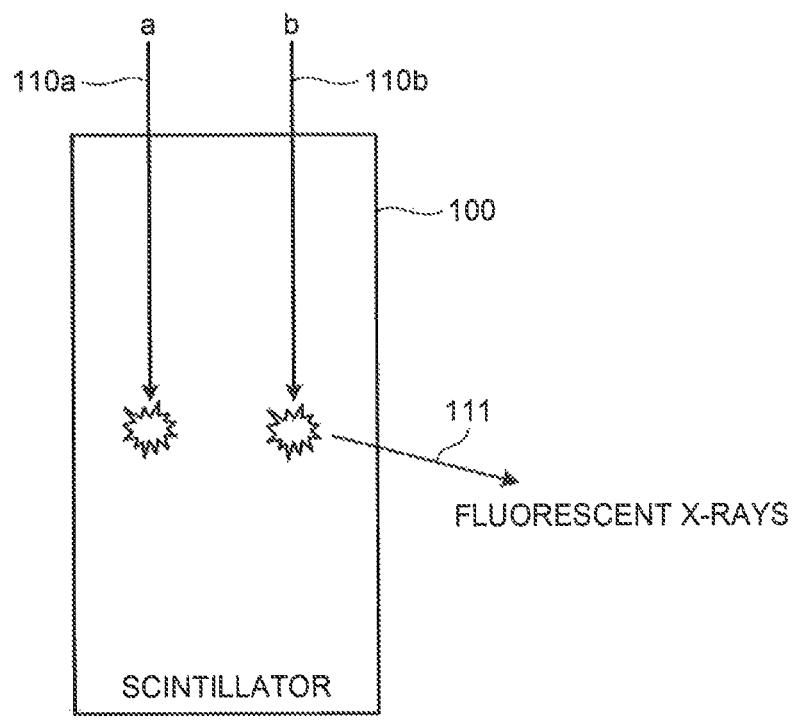
FIG. 4 is a diagram conceptually illustrating escape of X-ray fluorescence that can occur during radiation detection using a scintillator.

The following briefly describes an occurrence of the escape of X-ray fluorescence in each of the scintillators 100. FIG. 4 conceptually illustrates the escape of X-ray fluorescence that can occur during the radiation detection using the scintillator 100. Unless otherwise noted, each of FIG. 4 and the following similar drawings illustrates a section taken in a plane parallel to the incident direction of the radiation.

A state a in FIG. 4 illustrates an example of a case in which radiation 110a incident to the scintillator 100 loses all energy in the scintillator 100, and is converted into the scintillation light. A state b illustrates an example of a case in which radiation 110b incident to the scintillator 100 generates fluorescent X-rays 111 in the scintillator 100, and the fluorescent X-rays 111 are emitted out of the scintillator 100. As in the state b, the fluorescent X-rays 111 generated in the scintillator 100 by the incidence of the radiation are emitted out of the scintillator 100. This phenomenon is called the escape.

Figure 5:
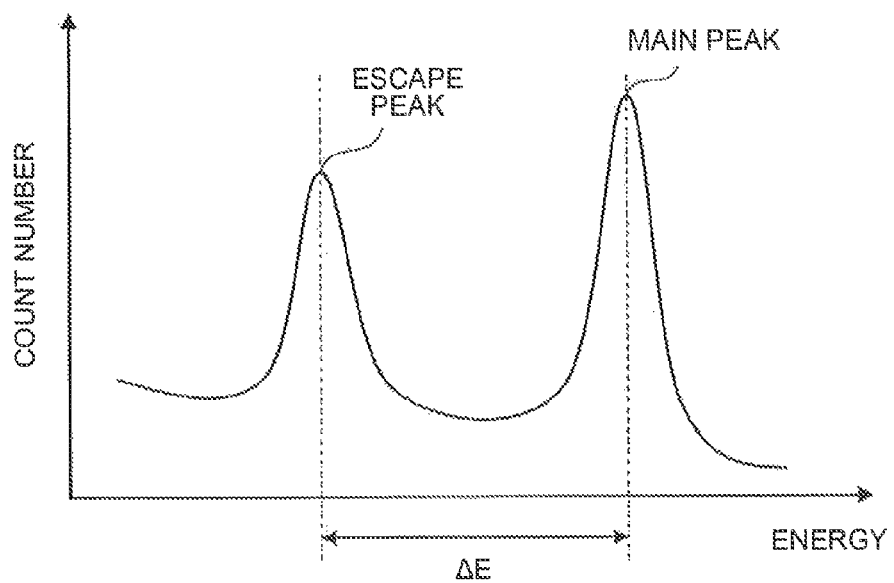
FIG. 5 is a diagram illustrating an outline of an energy spectrum obtained when the escape of X-ray fluorescence occurs in the measurement of the radiation using the scintillator.

FIG. 5 illustrates the outline of the energy spectrum obtained in the case in which the escape occurs with a certain probability, as in the state b of FIG. 4, when the radiation having a single energy level is measured using the scintillator 100. In FIG. 5, the horizontal axis represents the energy level, and the vertical axis represents the number of photons counted. As illustrated in FIG. 5, when the escape occurs, the energy spectrum has a main peak in the energy region of the incident radiation (such as X-rays) and an escape peak representing the energy region of the fluorescent X-rays. When ΔE denotes the energy of the fluorescent X-rays, the escape peak appears in an energy region at which the energy is smaller by ΔE than that of the main peak.

The energy of the fluorescent X-rays generated in the scintillator 100 varies depending on the atoms constituting the scintillator 100. The same atoms generate the fluorescent X-rays having a plurality of energy levels, so that a plurality of such escape peaks of FIG. 5 may appear in different energy regions in the actual radiation measurement. In this case, if a measured count number is large and the sample size is sufficiently large, the influence of the escape can be corrected by adding a count number at the escape peaks to a count number at the main peak. If, however, the sample size of the detection data is small, the correction increases the error in the count number at the main peak.

Structure of Scintillator According to First Embodiment

The following describes examples of the structure of the scintillator 100 according to a first embodiment. In the first embodiment, the shape on the radiation incident surface side of the scintillator 100 is contrived to reduce the energy lost by the escape.

Figure 6:
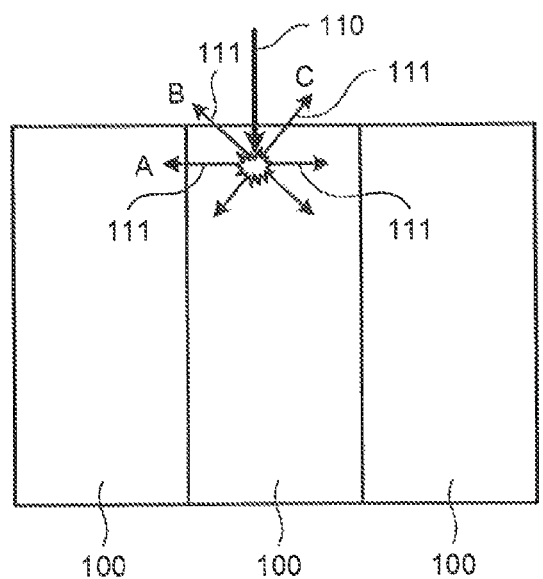
FIG. 6 is a diagram schematically illustrating a state in which fluorescent X-rays are generated in the scintillator.

FIG. 6 schematically illustrates a state in which the fluorescent X-rays are generated in the scintillator. In FIG. 6, radiation 110 enters the scintillator 100 located at the center. In the scintillator 100 located at the center, the fluorescent X-rays 111 generated by the incident radiation 110 are radiated and emitted in random directions with respect to the incident direction of the incident radiation serving as a generation source, as indicated by arrows A, B, and C in FIG. 6. In the case in which the fluorescent X-rays 111 are generated in the scintillator 100 located at the center, a count number caused by the fluorescent X-rays 111 can be included in the count number at the main peak if all the energy is re-absorbed in the scintillator 100 located at the center.

As indicated by arrow A in FIG. 6, some of the fluorescent X-rays 111 are absorbed in a scintillator 100 adjacent (for example, on the left) to the scintillator 100 located at the center to which the radiation 110 is incident, and thereby, a count number based on the absorbed X-rays 111 can be used to correct the main peak between the scintillators 100 located at the center and on the left adjacent to each other, by performing processing to be described later.

As indicated by arrows B and C in FIG. 6, if some of the fluorescent X-rays 111 escape from the incident surface of the scintillator 100 at the center out of the array constituted by the scintillators 100, the count number based on the generated fluorescent X-rays 111 is counted as the count number at the escape peak. In this case, statistical correction needs to be applied, and the reliability of the measurement results is reduced.

Here, attention is focused on the fluorescent X-rays generated on the surface of the scintillators 100 at the center to which the radiation 110 is incident. As illustrated in FIG. 6, if a plane formed by the surfaces (incident surfaces) of the scintillators 100 is flat, the directions of the fluorescent X-rays that can escape form a solid angle of substantially $2\pi$ sr.

Figure 7:
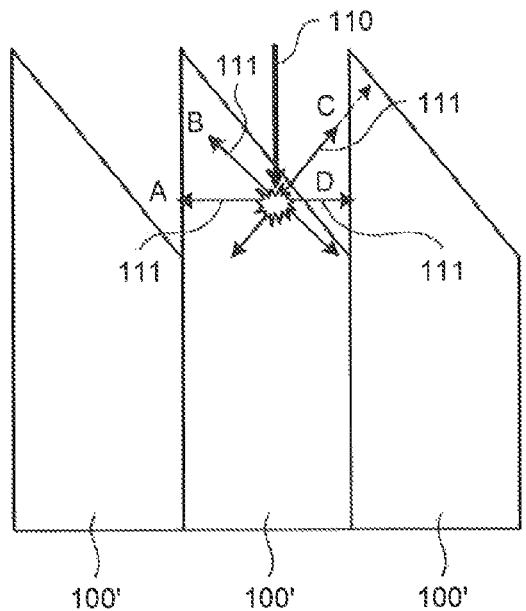
FIG. 7 is a diagram illustrating an example in which scintillators according to the embodiments are arranged, each forming an inclined incident surface.

In contrast, as illustrated in FIG. 7, a scintillator array is considered in which scintillators 100' each including an incident surface having an inclination are arrayed. In such a configuration, the incident surfaces in the scintillator array form periodic corrugations. In this case, when escape occurs from one of the scintillators 100' located at the center to which the radiation 110 is incident, some of the fluorescent X-rays 111 (such as fluorescent X-rays 111 indicated by arrow D) emitted by the escape out of the scintillator 100' located at the center may be re-absorbed by an adjacent scintillator 100', for example a right adjacent scintillator 100'.

As a result, with the configuration illustrated in FIG. 7, a larger percentage of the fluorescent X-rays 111 are re-absorbed by the scintillator 100' adjacent to the scintillator 100' receiving the radiation than in the case of the configuration of the scintillators 100 in which the plane formed by the incident surfaces is flat as illustrated in FIG. 6, and the directions of the fluorescent X-rays that can be escape peak are smaller than $2\pi$ sr on average. Consequently, providing an inclination to the incident surface of each of the scintillators reduces the escape peak more than in the case of the configuration in which the plane formed by the incident surfaces of the scintillators is flat, and thus can increase the count number at the main peak by an amount corresponding to the reduction of the escape peak.

The fluorescent X-rays have an energy region (specific energy region) specific to the atoms, and hence is capable of passing through the scintillator to some extent. As a result, in the structure of FIG. 7, a larger percentage of the fluorescent X-rays (such as fluorescent X-rays indicated by arrow C) are not absorbed by and passes through a region close to the top of the slope of the incident surface on the scintillator 100'. In a state in which the X-rays are incident in random positions to the scintillator array plane formed by the scintillators 100' in order to re-absorb the fluorescent X-rays in the scintillators 100', it is preferable that the adjacent scintillators 100' have the surfaces with the inclination greatly varying. Regarding the inclination of each scintillator 100', the cross section of the inclination is preferably made asymmetric.

Figure 8:
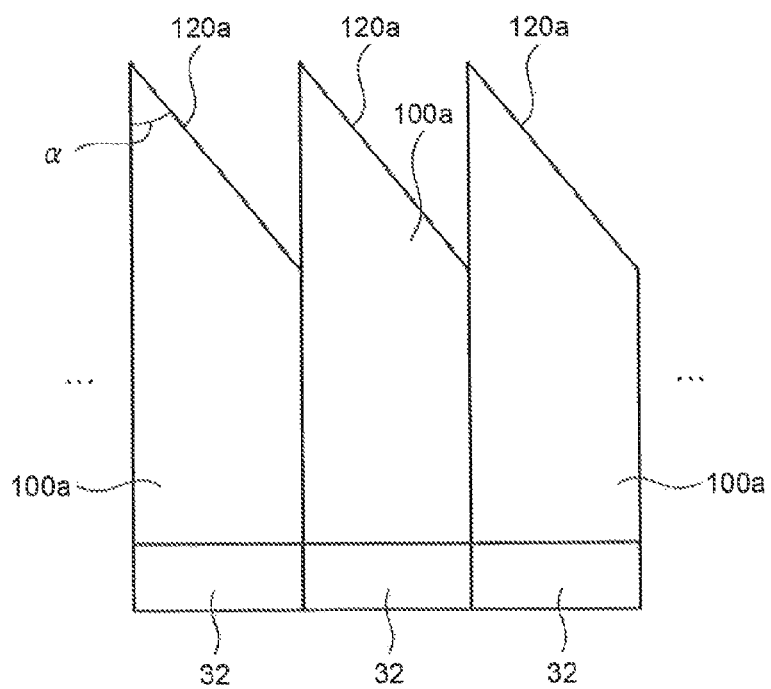
FIG. 8 is a diagram illustrating a structure of an example of scintillators according to a first embodiment.

FIG. 8 illustrates the structure of an example of the scintillators according to the first embodiment. In FIG. 8, each scintillator 100a is provided with one light receiving element 32. The scintillator 100a has an incident surface, that is, a surface at an end of the scintillator 100a opposed to a surface in contact with or close to the light receiving surface of the light receiving element 32. The incident surface forms an inclined surface 120a having an inclination in one direction.

When $\alpha$ denotes the acute one of angles with respect to a direction orthogonal to the light receiving surface of the light receiving element 32, the angle preferably satisfies $\alpha \leq 45°$. For example, a case is considered in which the radiation 110 is incident to the center of the inclined surface 120a in the direction orthogonal to the light receiving surface of the light receiving element 32. In this case, when the angle satisfies $\alpha \leq 45°$, the escaping fluorescent X-rays 111 can be expected to be re-absorbed with a probability of 50% in the plane illustrated in FIG. 8. With actual processing accuracy of the scintillator taken into account, the lower limit of the angle $\alpha$ is preferably 10° or larger. Accordingly, the angle $\alpha$ preferably satisfies $10° \leq \alpha \leq 45°$.

When the illustration in FIG. 8 is viewed as a scintillator array including a plurality of scintillators 100a, each of the scintillators 100a is arranged so that the inclination of the inclined surface 120a is periodically repeated in the scintillator array.

In each of FIG. 8 and the following similar drawings, unless otherwise noted, the detector array 33 including the light receiving elements 32 is configured so that the light receiving surfaces of the light receiving elements 32 lie in one plane. In FIG. 8, the scintillators 100a have the same maximum height. This configuration also commonly applies to the following similar drawings.

Figure 9:
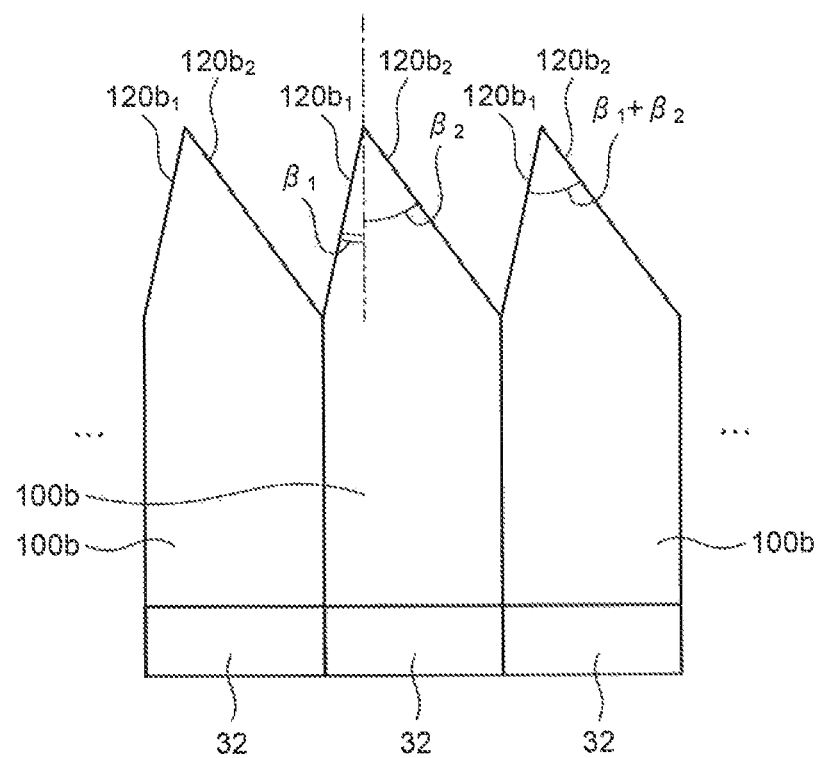
FIG. 9 is a diagram illustrating another example of the structure of the scintillators according to the first embodiment.

FIG. 9 illustrates another example of the structure of the scintillators according to the first embodiment. In FIG. 9, each scintillator 100b is provided with one light receiving element 32, and an incident surface of the scintillator 100b forms two inclined surfaces $120b_1$ and $120b_2$ each having an inclination in a direction different from that of the other one. The intersection line between the inclined surfaces $120b_1$ and $120b_2$ is set so as not to intersect a line that vertically extends from the center of the light receiving surface of the corresponding light receiving elements 32 and that is orthogonal to the light receiving surface. In other words, the scintillator 100b has an asymmetric shape when viewed from a direction of extension of the intersection line.

In the example of FIG. 9, an angle $\beta_1$ and an angle $\beta_2$ denote the acute ones of angles of the inclined surfaces $120b_1$ and $120b_2$, respectively, with respect to the direction orthogonal to the light receiving surface of the light receiving element 32. In this case, an angle $(\beta_1+\beta_2)$ obtained by adding the angle $\beta_1$ to the angle $\beta_2$ preferably satisfies the condition for the angle $\alpha$ illustrated in FIG. 8. For example, in the case of the example described above, the condition is such that $10° \leq (\beta_1+\beta_2) \leq 45°$ (where $\beta_1 \neq \beta_2$).

The example of FIG. 8 described above is considered to be a case in which one of the angles $\beta_1$ and $\beta_2$ is 0° in the structure of FIG. 9.

Figure 10:
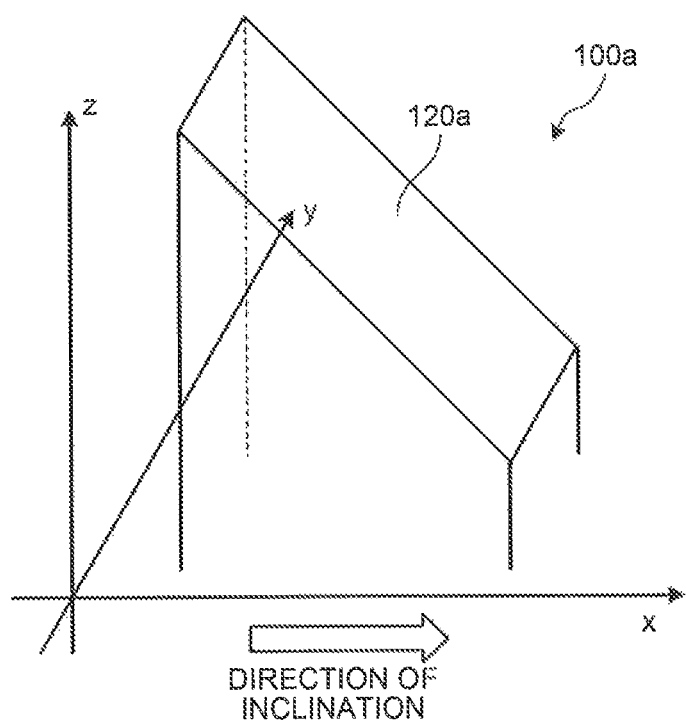
FIG. 10 is a diagram for defining a direction of each of the scintillators according to the first embodiment.

The following describes a preferable arrangement of the scintillators according to the first embodiment. The description will be given by way of an example of the scintillators 100a described above. First, using FIG. 10, the direction of the scintillator 100a according to the first embodiment will be defined. In FIG. 10, the xy-plane is a plane parallel to the light receiving surface of the light receiving element 32. It is assumed that the scintillator 100a has the shape of a rectangle (for example, a square) when viewed from the z-axis direction, and each sides of the rectangle is parallel to the x-axis or the y-axis. The direction of inclination coincides with a direction from a higher side toward a lower side, and is indicated by an arrow in FIG. 10.

The shape of the scintillator 100a viewed from the z-axis direction is not limited to the shape of a rectangle, but may be, for example, a triangle, a polygon having five sides or more, a circle, or an ellipse.

Figure 11A:
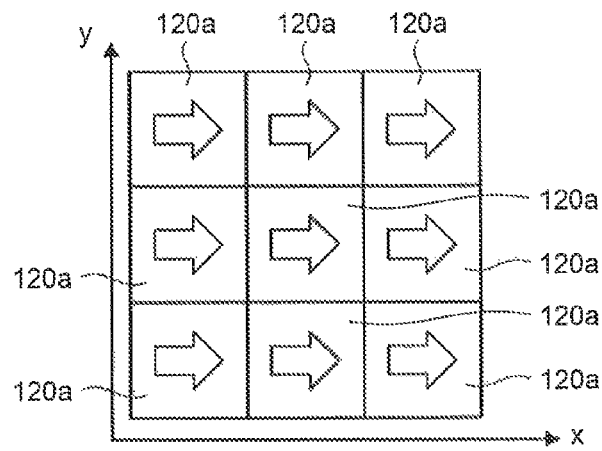
FIGS. 11A to 11C are diagrams each illustrating an example of an array of scintillators according to the first embodiment as viewed from the z-axis direction.
Figure 11B:
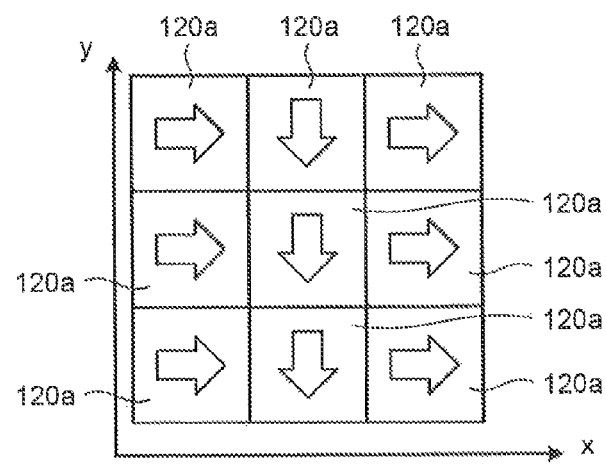
Figure 11C:
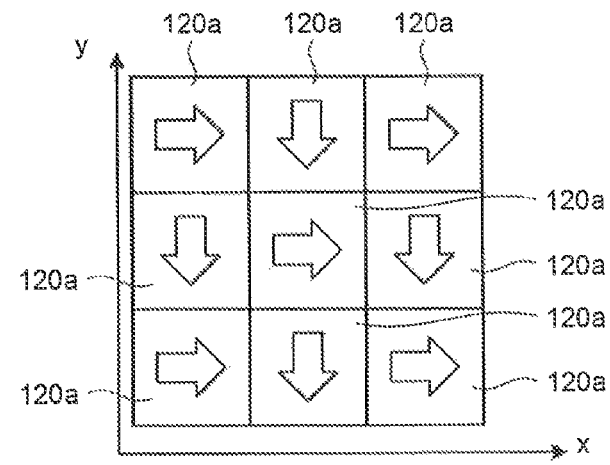

Each of FIGS. 11A to 11C illustrates an example of the array of the scintillators 100a according to the first embodiment as viewed from the z-axis direction. To avoid complexity, in FIGS. 11A, 11B and 11C, the inclined surfaces 120a included in the scintillators 100a are illustrated as the scintillators 100a. In the examples of FIGS. 11A, 11B and 11C, the scintillators 100a are arranged in a grid in the xy-plane, that is, a plane parallel to the light receiving surface of the light receiving element 32 (plane including the light receiving elements 32).

In FIG. 11A, all the scintillators 100a are arranged with the directions of the inclined surfaces 120a aligned in one direction (in the x-direction in this case). In the example of FIG. 11A, there is the inclination only in the x-direction, but there is no inclination in the y-direction. As a result, the fluorescent X-rays escaping from the inclined surface 120a can be expected to be re-absorbed by the scintillator 100a adjacent thereto in the x-direction. In contrast, the fluorescent X-rays escaping from the inclined surface 120a are very rarely absorbed by the scintillator 100a adjacent thereto in the y-direction.

FIG. 11B illustrates the example in which the directions of inclinations of the inclined surfaces 120a coincide with directions intersecting between adjacent columns or rows of the grid in which the scintillators 100a are arranged. In the example of FIG. 11B, the scintillators 100a are arranged with the directions of inclinations of the inclined surfaces 120a alternated between adjacent columns in the y-direction. In this case, the escaping fluorescent X-rays can be re-absorbed in both the x-direction and the y-direction. As a result, the escaping fluorescent X-rays can be expected to be more efficiently re-absorbed by the adjacent scintillators 100a than in the case of the example of FIG. 11A described above.

In this manner, the directions of inclinations of the inclined surfaces 120a vary between the adjacent scintillators 100a, so that the escaping fluorescent X-rays can be more efficiently re-absorbed by the adjacent scintillators 100a.

FIG. 11C illustrates the example in which the directions of inclinations of the inclined surfaces 120a coincide with directions intersecting between the adjacent scintillators 100a. With this arrangement, in the same manner as the arrangement of FIG. 11B described above, the escaping fluorescent X-rays can be re-absorbed in both the x-direction and the y-direction. As a result, the escaping fluorescent X-rays can be expected to be more efficiently re-absorbed by the adjacent scintillators 100a than in the case of the example of FIG. 11A described above.

As illustrated in FIGS. 11B and 11C, varying the directions of inclinations of the inclined surfaces 120a between the adjacent scintillators 100a allows the escaping fluorescent X-rays to be more efficiently re-absorbed.

The above has described that the directions of inclinations of the inclined surfaces 120a of the scintillators 100a coincide with the two x- and y-directions. The directions of inclinations of the inclined surfaces 120a are, however, not limited to those given in the examples, but may coincide with three or more directions. Moreover, the directions of inclinations of the inclined surfaces 120a are not limited to the directions along the sides of the scintillators 100a.

Escape Correction Method According to First Embodiment

The following describes an escape correction method according to the first embodiment, that is, a method for calculating the energy of the incident radiation based on the energy obtained in the scintillators 100a adjacent to the scintillator 100a to which the radiation is incident. In the method of re-absorbing the fluorescent X-rays by providing the inclined surfaces 120a as the incident surfaces of the scintillators 100a, a larger percentage of the energy are simultaneously detected by the adjacent scintillators 100a than in the case of employing the configuration in which the plane formed by the incident surfaces of the scintillators is flat.

The detection of the signals along with the re-absorption of the fluorescent X-rays has the following two features:

(I) the energy is simultaneously detected in the plurality of scintillators, and (II) the energy in the specific energy region originating from the fluorescent X-rays is detected.

Figure 12:
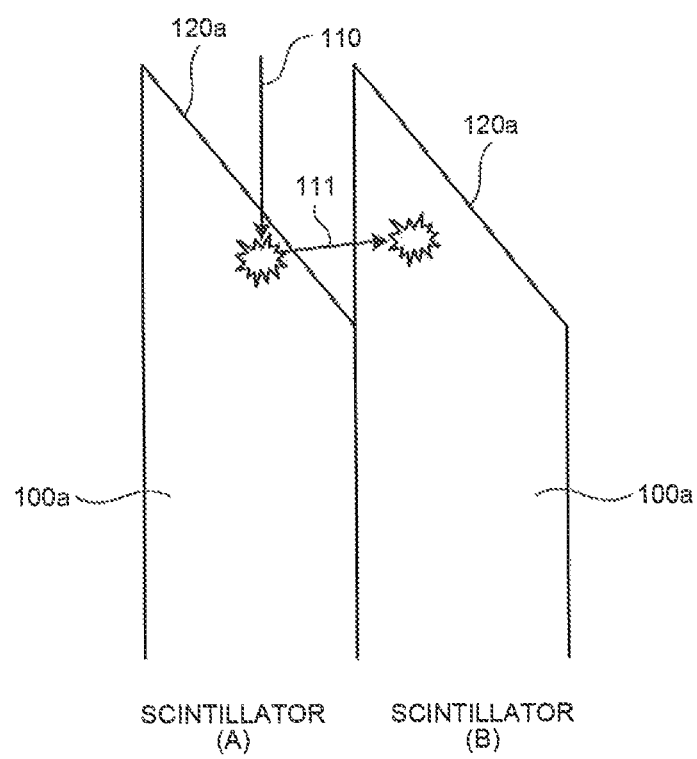
FIG. 12 is a diagram for explaining a specific example of a correction method according to the first embodiment.

The following describes a specific example of the correction method according to the first embodiment that uses the two features (I) and (II). Here, two adjacent scintillators (which are denoted as a scintillator (A) and a scintillator (B)) are considered, as illustrated in FIG. 12. In this state, the radiation 110 is incident on the inclined surface 120a of the scintillator (A), and the radiation 110 generates the fluorescent X-rays 111 in the scintillator (A). The fluorescent X-rays 111 escape from the inclined surface 120a of the scintillator (A), and are re-absorbed by the adjacent scintillator (B).

In the state of FIG. 12, the energy of the radiation 110 incident to the scintillator (A) is denoted as energy E, and it is assumed that the light receiving element 32 corresponding to the scintillator (A) obtains energy $E_1$, and the light receiving element 32 corresponding to the scintillator (B) obtains energy $E_2$. In this case, the energy values satisfy a relation given by the following Expression (1).

$$E = E_1 + E_2 \quad (1)$$

In addition, suppose that a fluctuation error including that due to a detector response depends on a Poisson distribution. When a fluctuation in the detected energy of the scintillator (A) is denoted as $\Delta_{E1}$, and a fluctuation in the detected energy of the scintillator (B) is denoted as $\Delta_{E2}$, the following Expressions (2) are satisfied.

$$\left. \begin{array}{l} \Delta_{E1} \approx \sqrt{E_1} \\ \Delta_{E2} \approx \sqrt{E_2} \end{array} \right\} \quad (2)$$

According to the law of propagation of errors, when the fluctuation error obtained by summing the detected energy of the scintillators (A) and (B) is calculated, the following Expression (3) is obtained.

$$\Delta_E = \sqrt{\Delta_{E1}{}^2 + \Delta_{E2}{}^2} \approx \sqrt{E_1 + E_2} \approx \sqrt{E} \quad (3)$$

As a result, it is shown that the fluctuation error of the energy obtained by summing the energy $E_1$ and the energy $E_2$ depends on the incident energy and is ideally equal to a fluctuation error obtained when the entire energy is detected in a single scintillator alone. In this manner, the fluctuation error of the total energy does not change even when summing the detected energy. Therefore, when a plurality of the scintillators are counted simultaneously in accordance with the re-absorption of the fluorescent X-rays, the main peak is restored by summing the energy, and thus the escape correction can be performed.

FIG. 13 is a flowchart of an example of the escape correction using the simultaneous counting according to the first embodiment. In the first embodiment, the processing/driving circuit 201 performs the processes in FIG. 13.

At Step S10, the processing/driving circuit 201 detects energy of each of the scintillators 100a based on a signal from corresponding one of the light receiving elements 32. At the next step, S11, based on the result of the energy detection at Step S10, the processing/driving circuit 201 determines whether the energy is simultaneously detected from the scintillators 100a. If not, the processing/driving circuit 201 ends the series of processes according to the flowchart of FIG. 13.

If, at Step S11, the energy is determined to be simultaneously detected from the scintillators 100a, the processing/driving circuit 201 allows the flow to proceed to Step S12.

At Step S12, the processing/driving circuit 201 determines whether the energy determined to be detected at Step S11 includes energy in the energy region caused by the fluorescent X-rays. More specifically, the processing/driving circuit 201 stores in advance information representing the energy region of the fluorescent X-rays that is expected to be obtained from material (elements) constituting the scintillators 100a, as parameters, in a memory or the like. In addition, taking an influence of the fluctuation error into account, the processing/driving circuit 201 sets a fluorescent X-ray determination zone in the energy spectrum based on a peak in the energy region of the fluorescent X-rays, as illustrated in FIG. 14. The fluorescent X-ray determination zone is preferably set to a range including the fluctuation error of the entire detector, and can be set to a range of, for example, ±3σ from the energy peak if, for example, it can be assumed that the distribution of the zone around the peak of the fluorescent X-rays can be approximated as a Gaussian distribution.

If the processing/driving circuit 201 determines, as a result of the determination at Step S12, that the energy detected at Step S11 does not include the energy in the energy region caused by the fluorescent X-rays 111, the processing/driving circuit 201 ends the series of processes according to the flowchart of FIG. 13.

If the processing/driving circuit 201 determines, as a result of the determination at Step S12, that the energy detected at Step S11 includes the energy in the energy region caused by the fluorescent X-rays 111, the processing/driving circuit 201 allows the flow to proceed to Step S13. At Step S13, the processing/driving circuit 201 adds the detected energy in the energy region of the fluorescent X-rays 111 to the energy detected from the scintillator 100a to which the radiation 110 generating the fluorescent X-rays 111 is incident. With this, the processing/driving circuit 201 can obtain a value of energy corrected by the amount of the energy emitted by the escape.

The processing described above will be more specifically explained using FIG. 12. First, based on the energy detection result obtained at Step S10, the processing/driving circuit 201 determines that the energy is simultaneously detected from the scintillators (A) and (B) (Step S11). The processing/driving circuit 201 then determines whether the energy detected from each of the scintillators (A) and (B) is energy in the fluorescent X-ray determination zone illustrated in FIG. 14. In this example, the processing/driving circuit 201 determines that the energy detected from the scintillator (B) is the energy in the fluorescent X-ray determination zone, and is thus, the energy in the energy region of the fluorescent X-rays 111 (Step S12).

In the case of this example, the processing/driving circuit 201 is capable of determining that the scintillator (A) from which the energy not originating from the fluorescent X-rays is detected is the scintillator to which the radiation 110 generating the fluorescent X-rays 111 detected from the scintillator (B) is incident. Based on these detection results, the processing/driving circuit 201 adds the energy $E_2$ detected from the scintillator (B) to the energy $E_1$ detected from the scintillator (A), and thereby restores the energy spectrum with a reduced influence of the escape by means of data processing.

If a large amount of radiation per unit time enters the scintillator array, independent rays of radiation may simultaneously enter the scintillators 100a in some cases. Hence, if the fluorescent X-ray determination zone does not include any detection energy from any of the scintillators 100a, the detected energy is determined to be caused by the independent rays of radiation. In this case, at Step S12 described above in the flowchart of FIG. 13, the detected energy is determined to be not including the energy in the energy region of the fluorescent X-rays, and the addition processing at Step S13 is not performed.

FIG. 12 mentioned above illustrates the example of scintillators (A) and (B) adjacent to each other with side surfaces thereof abutting. FIG. 15 illustrates the example of the scintillator array including the scintillators (A) and (B) as viewed from the incident surface. In FIG. 15, four scintillators (ii) are arranged in contact with the respective sides of the scintillator (A) lying at the center, and four scintillators (iii) are arranged in contact with the respective apexes of the scintillator (A). With reference to FIG. 15, the positional relation between the scintillators (A) and (B) is expressed in such a way that the scintillator (B) corresponds to any of the scintillators (ii) in contact with the respective sides of the scintillator (A) lying at the center.

In the addition processing of the detected energy, the targets of the determination of the simultaneous detection may include not only the four scintillators (ii) most closely adjacent to the scintillator (A) in question, but also the neighboring eight scintillators including the scintillators (iii). If the energy in the energy region of the fluorescent X-rays can pass through scintillators, scintillators in positions away from the scintillator in question by a plurality of scintillators may be subject to the criterion of simultaneity of energy in the addition processing.

Measuring System According to First Embodiment

Figure 16:
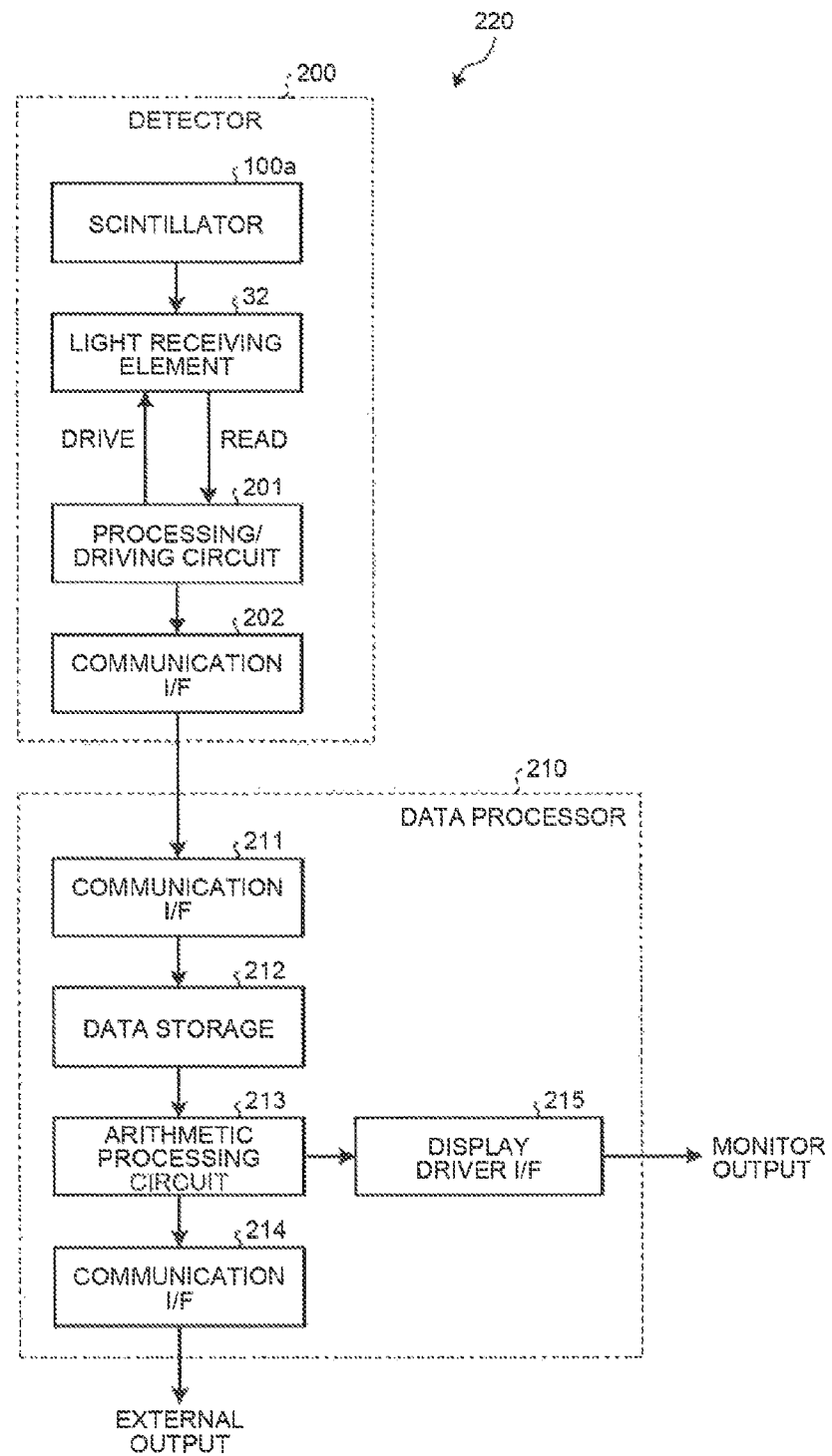
FIG. 16 is a diagram illustrating a configuration of an example of a measuring system according to the first embodiment.

The following describes a measuring system according to the first embodiment. FIG. 16 illustrates the configuration of an example of the measuring system according to the first embodiment. In FIG. 16, the parts common to those in FIG. 3 mentioned above are given the same reference numerals, and detailed description thereof will not be given.

In FIG. 16, this measuring system 220 includes a detector 200 and a data processor 210. The detector 200 is provided by adding a communication interface (I/F) 202 to the measuring device 2 illustrated in FIG. 3, and employing the scintillators 100a (refer to FIG. 8) according to the first embodiment instead of the scintillators 100. The detector 200 is not limited to have this configuration, but may employ the scintillators 100b explained using FIG. 9 instead of the scintillators 100.

In the detector 200, the processing/driving circuit 201 drives the light receiving elements 32, and reads electric signals corresponding to the received scintillation light from the light receiving elements 32. As described above, the processing/driving circuit 201 applies the predetermined signal processing such as the waveform shaping and the analog/digital conversion to the electric signals read from the light receiving elements 32, and outputs the results as the detection data. The detection data output from the processing/driving circuit 201 is transmitted to the data processor 210 via the communication I/F 202.

The data processor 210 includes communication I/Fs 211 and 214, a data storage 212, an arithmetic processing circuit 213, and a display driver I/F 215, and can be made, for example, using a personal computer. The communication I/F 211 controls communication with the communication I/F 202 of the detector 200. The data storage 212 is a hard disk drive or a flash memory, and stores data and programs.

The arithmetic processing circuit 213 includes a central processing unit (CPU), a read-only memory (ROM), and a random access memory (RAM), and performs arithmetic processing by following a program stored in the ROM or the data storage, and using the RAM as a work memory. The arithmetic processing circuit 213 follows a program to control operations of the entire data processor 210. Moreover, the arithmetic processing circuit 213 can communicate with the detector 200 via the communication I/F 211 to further control operations of the detector 200.

The display driver I/F 215 outputs a monitor output signal according to a display control signal generated by the arithmetic processing circuit 213, for example, according to arithmetic processing results, and drives a monitor device using a display device such as a liquid-crystal display (LCD) to display a screen according to the display control signal. The communication I/F 214 is an interface to a communication network such as a local area network (LAN) or the Internet and externally sends through the communication network, for example, the data of the arithmetic processing results output from the arithmetic processing circuit 213. The communication I/F 214 is not limited to such an interface, but may be a data interface such as a Universal Serial Bus (USB) interface or a Bluetooth (registered trademark) interface.

Figure 17:
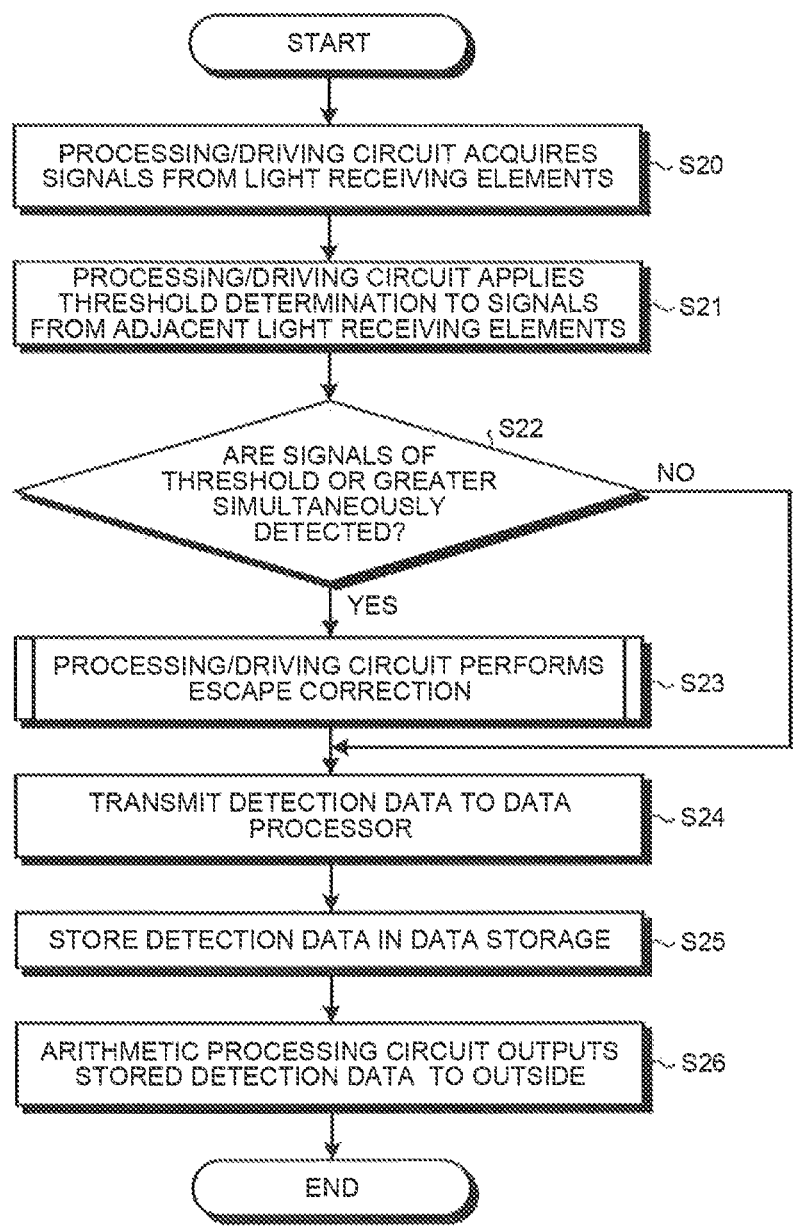
FIG. 17 is a flowchart of an example illustrating measuring process according to the first embodiment.

FIG. 17 is a flowchart of an example illustrating measuring process according to the first embodiment. The light receiving elements 32 respectively corresponding to the respective scintillators 100a receive the scintillation light emitted from the respective scintillators 100a based on the incidence of the radiation, and convert the received scintillation light into electric signals corresponding to the intensity thereof. At Step S20, the processing/driving circuit 201 acquires the electric signals output from the respective light receiving elements 32. In other words, the processing/driving circuit 201 acquires values corresponding to the intensities of the received scintillation lights in the form of the electric signals output from the light receiving elements 32.

At the next step, S21, the processing/driving circuit 201 performs a threshold determination with respect to the electric signals acquired from the light receiving elements 32 adjacent to each other. At the next step, S22, according to the threshold determination at Step S21, the processing/driving circuit 201 determines whether the adjacent light receiving elements 32 have simultaneously detected the electric signals equal to or greater than a threshold. If not, the processing/driving circuit 201 allows the flow to proceed to Step S24.

If, at Step S22, the adjacent light receiving elements 32 are determined to have simultaneously detected the electric signals equal to or greater than the threshold, the processing/driving circuit 201 allows the flow to proceed to Step S23. In this case, the fluorescent X-rays emitted by the escape are considered to be re-absorbed by the adjacent scintillator 100a. At Step S23, the processing/driving circuit 201 follows the flowchart of FIG. 13 described above to perform the escape correction. After ending the processes according to the flowchart of FIG. 13, the processing/driving circuit 201 allows the flow to proceed to Step S24.

At Step S24, the processing/driving circuit 201 transmits the energy based on the electric signals acquired from the light receiving elements 32, as the detection data of the radiation, to the data processor 210. If the processing of Step S23 described above has been performed, the processing/driving circuit 201 transmits the energy corrected by the amount of the energy emitted by the escape, as the detection data, to the data processor 210.

The data processor 210 receives the detection data transmitted from the processing/driving circuit 201 via the communication I/F 211, and stores the received detection data in the data storage 212 (Step S25). At the next step, S26, the arithmetic processing circuit 213 in the data processor 210 reads the stored detection data from the data storage 212, and outputs the read data from the communication I/F 214 and/or the display driver I/F 215 to the outside.

In this manner, according to the first embodiment, the incident surfaces of the scintillators are configured as the asymmetric inclined surface, and the fluorescent X-rays emitted out of the scintillators by the escape are re-absorbed by the adjacent scintillators, so that the fluorescent X-rays are restrained from flowing out of the scintillator array. In the first embodiment, the scintillators adjacent to each other are subjected to the simultaneous counting, so that the energy can be accurately measured when the energy of the incident radiation is detected after being divided into a plurality of energy regions along with the escape between the scintillators. According to the first embodiment, the escape can be reduced to increase the count number at the main peak, and thus the energy spectrum can be corrected with smaller statistical errors even from fewer pieces of radiation measurement data.

Furthermore, according to the first embodiment, the incident surfaces of the scintillators are formed as the inclined surfaces to absorb the fluorescent X-rays emitted by the escape, so that the accuracy of detection of the radiation energy can be improved. The influence of the escape between the scintillators can be corrected by simultaneously counting the detection results of the adjacent scintillators. As a result, the same statistical accuracy can be obtained from a smaller number of pieces of data compared with the case in which each of the incident surfaces of the scintillators is parallel to the light receiving surfaces of the light receiving elements.

As a result, a computed tomography (CT) device providing low dose and high image quality can be made, for example, using the scintillator array constituted by the scintillators 100a or 100b according to the first embodiment.

For example, measurement of the energy spectrum using a material such as LYSO, NaI, and YAP that are generally used for scintillators shows the escape peak in the energy region at which the energy level is lower than that of the main peak by an amount of energy of the fluorescent X-rays. Using such an energy spectrum that does not correctly represent the actual incident energy can cause, for example, noise in a reconstructed image by the CT. A method of using statistical processing to correct the influence of the escape can also be employed. In that case, however, data with a small sample size may cause a large error in the correction. Therefore, it is important to reduce the amount of generated escape so as to obtain the energy spectrum with a small error.

First Modification of First Embodiment

Figure 18:
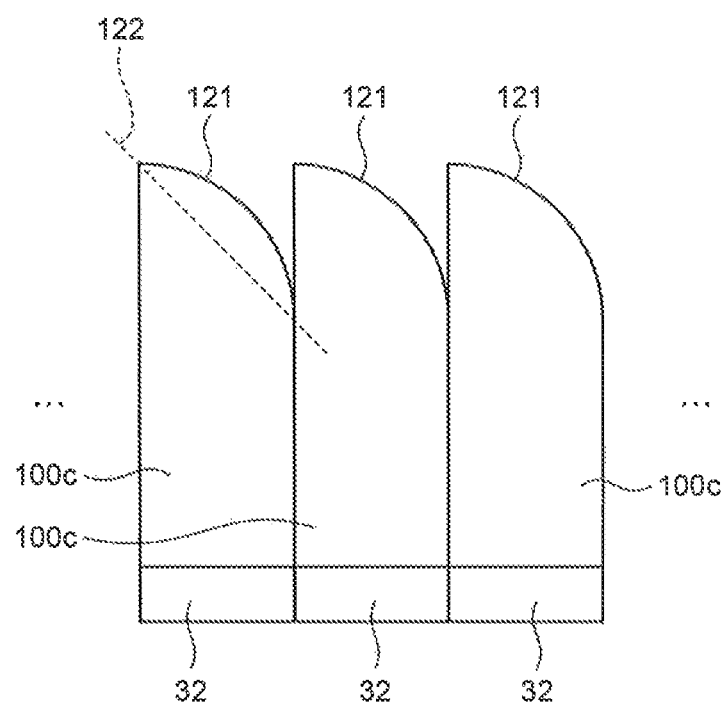
FIG. 18 is a diagram illustrating a configuration of an example of scintillators according to a first modification of the first embodiment.

The following describes a first modification of the first embodiment. FIG. 18 illustrates the configuration of an example of scintillators according to the first modification of the first embodiment. In FIG. 18, the parts common to those in FIG. 8 are given the same reference numerals, and detailed description thereof will not be given.

The example in FIG. 18 is an example in which the incident surface of each scintillator 100c forms an upward convex curved surface 121, unlike the incident surface of the scintillator 100a illustrated in FIG. 8. The curved surface 121 can be considered to be formed, for example, by convexing upward an inclined surface 122 that is the same as the inclined surface 120a of the scintillator 100a illustrated in FIG. 8. In this manner, when the incident surface is the upward convex curved surface, the fluorescent X-rays escaping from the scintillator 100c can also be re-absorbed by the adjacent scintillator 100c.

Second Modification of First Embodiment

Figure 19:
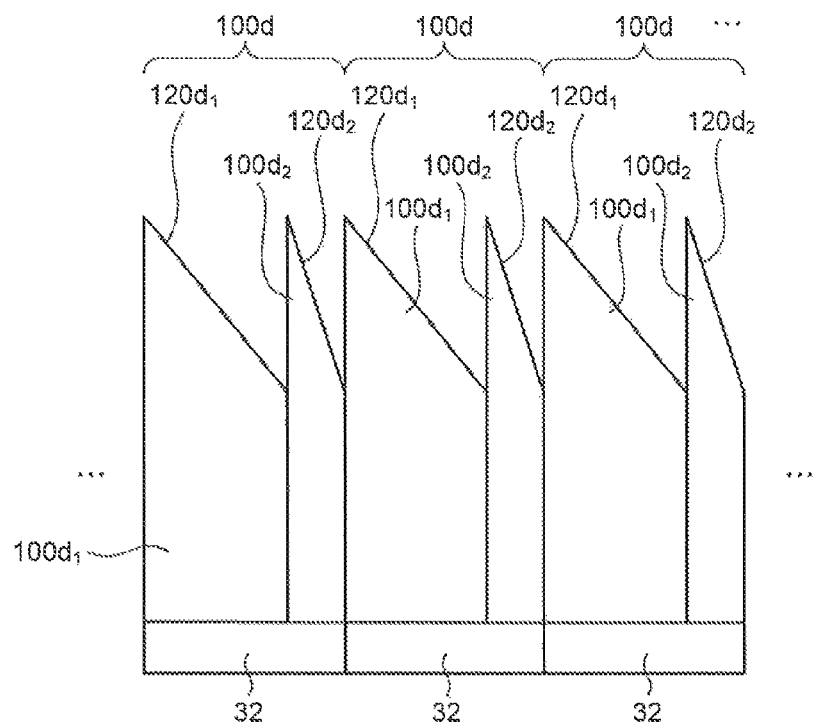
FIG. 19 is a diagram illustrating a configuration of an example of scintillators according to a second modification of the first embodiment.

The following describes a second modification of the first embodiment. The second modification of the first embodiment is an example in which a plurality of types of scintillators are provided for one light receiving element 32. FIG. 19 illustrates the configuration of an example of the scintillators according to the second modification of the first embodiment. In FIG. 19, the parts common to those in FIG. 8 mentioned above are given the same reference numerals, and detailed description thereof will not be given.

In FIG. 19, each scintillator 100d includes two scintillators $100d_1$ and $100d_2$ having inclined surfaces $120d_1$ and $120d_2$ with inclinations different from each other as incident surfaces. The two scintillators $100d_1$ and $100d_2$ are arranged for each one of the light receiving element 32. Specifically, the light receiving element 32 detects the scintillator light generated by the scintillators $100d_1$ and $100d_2$. When the illustration in FIG. 19 is viewed as a scintillator array including a plurality of scintillators 100d, the two scintillators $100d_1$ and $100d_2$ included in each of the scintillators 100d are periodically arranged.

With the configuration of FIG. 19, the fluorescent X-rays escaping from the scintillator $100d_1$ can be re-absorbed by the scintillator $100d_2$ sharing the light receiving element 32 therewith, so that the escape peak can be more efficiently reduced.

The scintillators $100d_1$ and $100d_2$ need not be made of the same material.

Other Example of Second Modification of First Embodiment

The following describes another example of the second modification of the first embodiment. The other example of the second modification of the first embodiment is an example in which the incident surface of a first scintillator is formed into an inclined surface, the incident surface of a second scintillator is a surface parallel to the light receiving surface of the light receiving element 32, and the first and second scintillators are provided for one light receiving element 32.

Figure 20:
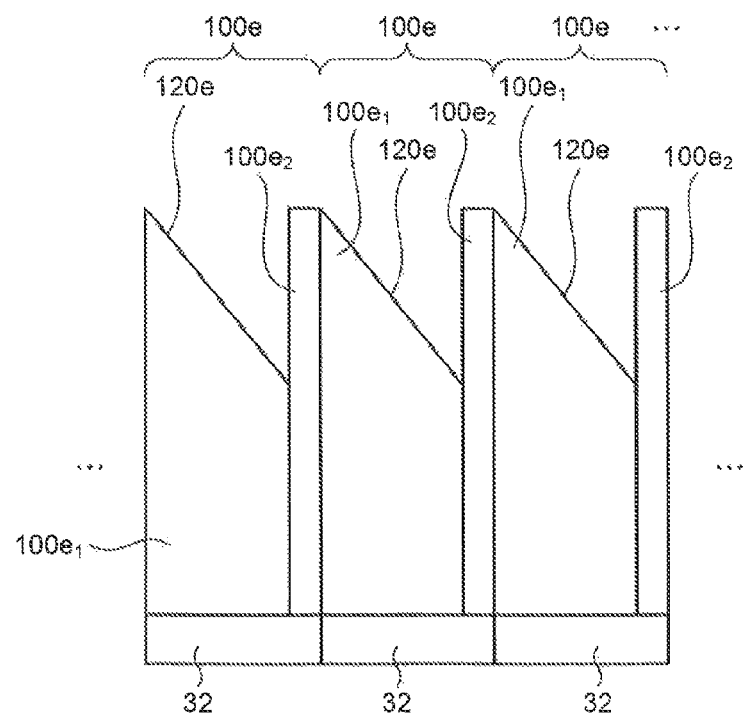
FIG. 20 is a diagram illustrating a configuration of an example of scintillators according to another example of the second modification of the first embodiment.

FIG. 20 illustrates the configuration of an example of the scintillators according to the other example of the second modification of the first embodiment. In FIG. 20, the parts common to those in FIG. 8 mentioned above are given the same reference numerals, and detailed description thereof will not be given.

In FIG. 20, each scintillator $100e$ includes a first scintillator $100e_1$ with the incident surface being formed into an inclined surface $120e$ and a second scintillator $100e_2$ with the incident surface being formed into a surface parallel to the light receiving surface of the light receiving element 32. The two scintillators $100e_1$ and $100e_2$ are arranged for each one of the light receiving elements 32. Specifically, the light receiving element 32 detects the scintillator light generated by the scintillators $100e_1$ and $100e_2$. When the illustration in FIG. 20 is viewed as a scintillator array including a plurality of scintillators $100e$, the two scintillators $100e_1$ and $100e_2$ included in each of the scintillators $100e$ are periodically arranged.

Also with this configuration, the fluorescent X-rays escaping from the scintillator $100e_1$ can be re-absorbed by the scintillator $100e_2$ sharing the light receiving element 32 therewith, so that the escape peak can be more efficiently reduced. The fluorescent X-rays can be restrained from escaping from the scintillator $100e_2$ by setting the area of the incident surface, which is parallel to the light receiving surface of the light receiving element 32, of the scintillator $100e_2$ to be smaller than the area of the incident surface of the scintillator $100e_1$.

Also in the other example of the second modification of the first embodiment, the scintillators $100e_1$ and $100e_2$ need not be made of the same material. For example, the scintillator $100e_2$ can be made of a material having a lower density than that of the scintillator $100e_1$.

Third Modification of First Embodiment

The following describes a third modification of the first embodiment. The third modification of the first embodiment is an example in which one scintillator is constituted by a plurality of types of scintillators.

Each of FIGS. 21A and 21B illustrates the configuration of an example of scintillators according to the third modification of the first embodiment. In FIGS. 21A and 21B, the parts common to those in FIG. 8 mentioned above are given the same reference numerals, and detailed description thereof will not be given.

FIG. 21A illustrates the example in which a scintillator $100f$ includes a scintillator $100f_1$ and a scintillator $100f_2$ that has an absorption cross section relatively smaller than that of the scintillator $100f_1$. The incident surface of the scintillator $100f_1$ is formed into an inclined surface $120f_1$ in the same manner as in the case of the scintillator $100a$ illustrated in FIG. 8 mentioned above. A surface on one side of the scintillator $100f_2$ is in close contact with the inclined surface $120f_1$ of the scintillator $100f_1$, and a surface on the other side of the scintillator $100f_2$ is formed into an inclined surface parallel to the inclined surface $120f_1$. The scintillator $100f_2$ has a uniform thickness. The thickness of the scintillator $100f_2$ is sufficiently smaller than the height of the scintillator $100f_1$.

The scintillator $100f_1$ is in contact with the scintillator $100f_2$, for example, with optical grease having a matching refractive index interposed therebetween. The scintillation light generated in the scintillator $100f_2$ can reach the light receiving element 32.

Due to the generation process of the fluorescent X-rays, the fluorescent X-rays are emitted as energy in a lower energy region than energy of the X-rays (radiation) incident to the scintillator. As a result, when compared in terms of penetrating power in materials, the fluorescent X-rays are expected to have lower penetrating power than that of the radiation incident to the scintillator. Using this difference in the penetrating power dependent on the energy region can reduce the escape of the fluorescent X-rays from the surface of the scintillator.

Specifically, in FIG. 21A, the incident radiation has higher penetrating power in the scintillator $100f_2$ to which the radiation is directly incident, and thereby is expected to more easily reach the scintillator $100f_1$. In contrast, the fluorescent X-rays generated in the scintillator $100f_1$ have lower penetrating power than that the incident radiation has, and thereby is more likely to be re-absorbed in the scintillator $100f_2$ having a smaller absorption cross section.

Consequently, by arranging the scintillator $100f_2$ having a relatively smaller absorption cross section than that of the scintillator $100f_1$ on the incident surface of the scintillator $100f_1$, the fluorescent X-rays can be more restrained from being emitted out of the scintillator array by the escape than in the case of simply having the structure in which the incident surfaces are periodically inclined.

FIG. 21B illustrates the other example of the configuration of the scintillators according to the third modification of the first embodiment. The example in FIG. 21B is an example in which the scintillator $100f'$ includes the scintillator $100f_1$ described above and a scintillator $100f_3$ that has an absorption cross section relatively smaller than that of the scintillator $100f_1$. Whereas the scintillator $100f_2$ of FIG. 21A has a uniform thickness, the scintillator $100f_3$ illustrated in FIG. 21B has a nonuniform thickness. In the example of FIG. 21B, whereas a surface of the scintillator $100f_3$ in contact with the scintillator $100f_1$ has an inclination common to that of the inclined surface $120f_1$ serving as the incident surface of the scintillator $100f_1$, the incident surface of the scintillator $100f_3$ is formed into a surface $120f_3$ parallel to the light receiving surface of the light receiving element 32.

Of the configurations of the scintillators according to the respective modifications and the other examples thereof of the first embodiment described above, configurations not exclusive of one another can be used by being combined with one another.

Second Embodiment

The following describes a second embodiment. In the respective modifications and the other examples thereof of the first embodiment described above, the processing/driving circuit 201 performs the escape correction, as explained using the flowchart of FIG. 17. In the second embodiment, the arithmetic processing circuit 213 included in the data processor 210 performs the escape correction.

In the second embodiment, the measuring system 220 according to the first embodiment described using FIG. 16 can be used without modification as a measuring system, so that no description thereof will be given. Scintillators can have any of the configurations described in the respective modifications and the other examples thereof of the first embodiment described above.

Figure 22:
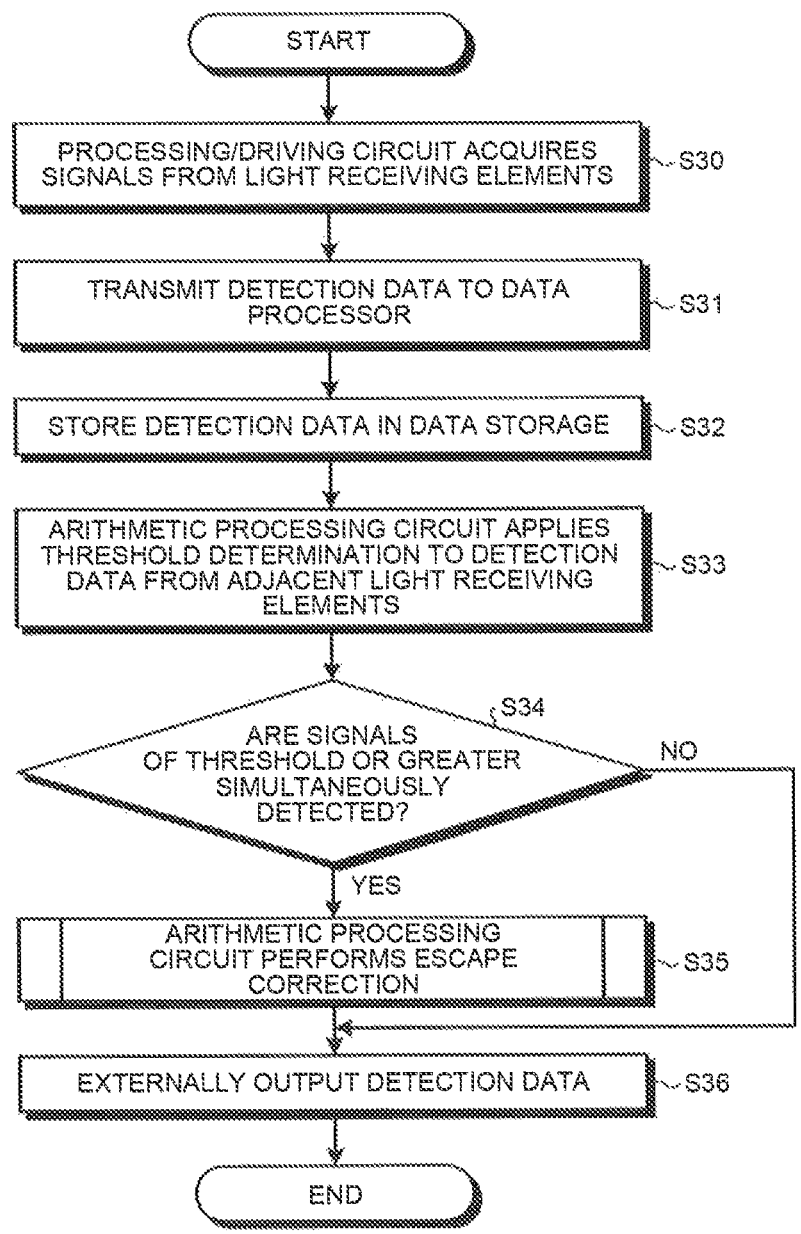
FIG. 22 is a flowchart of an example illustrating measuring process according to a second embodiment.

FIG. 22 is a flowchart of an example illustrating measuring process according to the second embodiment. The scintillators 100a according to the first embodiment described using FIG. 8 are used as the scintillators in this measuring process. The present embodiment is, however, not limited to this example, but may use scintillators having any of the configurations described in the respective modifications and the other examples thereof of the first embodiment above.

The light receiving elements 32 respectively corresponding to the scintillators 100a receive the scintillation light emitted from the respective scintillators 100a based on the incidence of the radiation, and convert the received scintillation light into the electric signals corresponding to the intensity thereof. At Step S30, the processing/driving circuit 201 acquires the electric signals output from the respective light receiving elements 32, and applies the predetermined signal processing, such as the waveform shaping and the analog/digital conversion, to the acquired electric signals to obtain the detection data. At Step S31, the processing/driving circuit 201 transmits the detection data to the data processor 210.

The data processor 210 receives the detection data transmitted from the processing/driving circuit 201 via the communication I/F 211, and stores the received detection data in the data storage 212 (Step S32).

At the next step, S33, the arithmetic processing circuit 213 in the data processor 210 reads the stored detection data from the data storage 212. The arithmetic processing circuit 213 then performs the threshold determination with respect to the detection data based on the electric signals acquired from the light receiving elements 32 adjacent to each other. At the next step, S34, according to the threshold determination at Step S33, the arithmetic processing circuit 213 determines whether the adjacent light receiving elements 32 have simultaneously detected the electric signals equal to or greater than the threshold. If not, the arithmetic processing circuit 213 allows the flow to proceed to Step S36 to output the detection data from the communication I/F 214 and/or the display driver I/F 215 to the outside.

If, at Step S34, the adjacent light receiving elements 32 are determined to have simultaneously detected the electric signals equal to or greater than the threshold, the arithmetic processing circuit 213 allows the flow to proceed to Step S35. At Step S35, the arithmetic processing circuit 213 follows the flowchart of FIG. 13 described above to perform the escape correction. After ending the processes according to the flowchart of FIG. 13, the arithmetic processing circuit 213 allows the flow to proceed to Step S36 to output the detection data after being subjected to the escape correction processing from the communication I/F 214 and/or the display driver I/F 215 to the outside.

In this manner, also in the second embodiment, the escape correction processing can be performed by applying the simultaneous counting to the detection results by the scintillators 100a. According to the configuration of the second embodiment, the arithmetic processing circuit 213 performs the escape correction by applying the simultaneous counting. Consequently, the configuration of the processing/driving circuit 201 in the detector 200 can be simpler than the configuration thereof in the first embodiment.

In the description above, the configurations of the respective embodiments are applied to the inspection device 1 such as the CT device. The embodiments are, however, not limited to this example. In other words, the configurations of the respective embodiments are also applicable to other types of devices that use a scintillator array to detect radiation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measuring device comprising:
a plurality of scintillators to each convert incident radiation into light;
a plurality of receiving elements to each convert scintillation light received by a light receiving surface thereof into an electric signal; and
a processor to acquire a value corresponding to an intensity of the incident radiation based on the electric signal, wherein
each of the scintillators has an end that is an incident surface and has another end at which the light receiving surface is provided,
the incident surface includes an inclination that has a predetermined angle with respect to the light receiving surface and that is asymmetric relative to a direction connecting the incident surface to the light receiving surface, with respect to a center of the incident surface,
the plurality of scintillators are arrayed on a plane including the light receiving surface, and
another scintillator having a lower density than that of the plurality of scintillators is arranged on the incident surface.

2. The device according to claim 1, wherein, among the plurality of scintillators, a first scintillator having the inclination in a first direction and a second scintillator having the inclination in a second direction intersecting the first direction are arranged adjacent to each other.

3. The device according to claim 1, wherein the scintillator includes one inclination.

4. The device according to claim 1, wherein the inclination forms an acute angle of 45° or smaller with respect to a direction orthogonal to the light receiving surface.

5. The device according to claim 1, wherein one light receiving element is provided for one scintillator.

6. The device according to claim 1, wherein one light receiving element is provided for the plurality of scintillators.

7. The measuring device claim 1, wherein the processor performs signal detection by simultaneously counting the electric signals output from the light receiving elements adjacent to each other.

8. The device according to claim 1, wherein
when the processor has acquired first energy based on the electric signal detected from a first light receiving element serving as a target among the light receiving elements, and has acquired, at the same time, second energy in a specific energy region specific to material of the scintillator based on the electric signal detected from a second light receiving element neighboring the first light receiving element, the processor acquires, as energy corresponding to the intensity of the radiation incident on the scintillator corresponding to the first light receiving element, energy obtained by adding the second energy to the first energy.

9. The device according to claim 1, wherein the scintillators are arrayed in a grid.

* * * * *

UNITED STATES PATENT AND TRADEMARK OFFICE
CERTIFICATE OF CORRECTION

PATENT NO. : 9,529,095 B2
APPLICATION NO. : 14/837097
DATED : December 27, 2016
INVENTOR(S) : Kobayashi et al.

It is certified that error appears in the above-identified patent and that said Letters Patent is hereby corrected as shown below:

On the Title Page

Item (72), in the Inventors, Line 2, change "Rei Hasegawa, Kanagawa (JP)" to --Rei Hasegawa, Yokohama (JP)--.

In the Claims

Claim 7, Column 18, Line 64, change "The measuring device claim 1," to --The measuring device according to claim 1,--.

Signed and Sealed this
Ninth Day of May, 2017

Michelle K. Lee
*Director of the United States Patent and Trademark Office*